US009870261B2

United States Patent
Cao et al.

(10) Patent No.: US 9,870,261 B2
(45) Date of Patent: *Jan. 16, 2018

(54) MANAGING A SET OF ASSETS FOR A USER IN A SHARED POOL OF CONFIGURABLE COMPUTING RESOURCES

(71) Applicant: International Business Machines Corporation, Armonk, NY (US)

(72) Inventors: Bin Cao, Rochester, MN (US); James E. Carey, Rochester, MN (US); Bradley L. Manning, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,159

(22) Filed: May 21, 2015

(65) Prior Publication Data

US 2016/0274942 A1    Sep. 22, 2016

Related U.S. Application Data

(63) Continuation of application No. 14/663,977, filed on Mar. 20, 2015.

(51) Int. Cl.
*G06F 9/455*    (2006.01)
*G06F 9/50*    (2006.01)
(Continued)

(52) U.S. Cl.
CPC ............. *G06F 9/5011* (2013.01); *G06F 8/61* (2013.01); *G06F 9/45558* (2013.01);
(Continued)

(58) Field of Classification Search
CPC ............. G06F 9/45558; G06F 11/3438; G06F 21/105; G06F 11/30; G06F 11/3409;
(Continued)

(56) References Cited

U.S. PATENT DOCUMENTS 5,717,604 A * 2/1998 Wiggins ................. G06F 21/10
  705/412
7,013,290 B2 * 3/2006 Ananian ........... G06F 17/30867
  705/26.42

(Continued)

OTHER PUBLICATIONS

Fu et al., The Netflix Tech Blog: "Janitor Monkey—Keeping the Cloud Tidy and Clean," Jan. 4, 2013, <techblog.netflix.com/2013/01/janitor-monkey-keeping-cloud-tidy-and.html>, 2013.

(Continued)

*Primary Examiner* — Benjamin Wu
*Assistant Examiner* — Willy W Huaracha
(74) *Attorney, Agent, or Firm* — Scott S. Dobson

(57) ABSTRACT

Disclosed aspects include managing a set of assets for a user in a shared pool of configurable computing resources. The shared pool of configurable computing resources has a set of virtual machines. A set of usage data for the user is established. The set of usage data corresponds to usage of an asset by the user. Based on the set of usage data for the user, an asset action for the asset for the user on a virtual machine is determined. In response to determining the asset action for the asset, the asset action for the asset for the user on the virtual machine is selected.

17 Claims, 5 Drawing Sheets

(51) Int. Cl.
*G06F 9/445* (2006.01)
*G06F 11/30* (2006.01)
*G06F 11/34* (2006.01)

(52) U.S. Cl.
CPC ............ *G06F 9/5077* (2013.01); *G06F 11/30* (2013.01); *G06F 11/3409* (2013.01); *G06F 2009/4557* (2013.01); *G06F 2009/45591* (2013.01); *G06F 2009/45595* (2013.01); *G06F 2201/81* (2013.01); *G06F 2201/815* (2013.01); *G06F 2201/865* (2013.01)

(58) Field of Classification Search
CPC ............ G06F 8/61; G06F 2009/45595; G06F 2201/81; G06F 2201/815; G06F 2201/865; G06F 9/5011; G06F 9/5077; G06F 2009/4557; G06F 2009/45591
USPC ............................................................ 718/1
See application file for complete search history.

(56) References Cited

U.S. PATENT DOCUMENTS

| | | | |
|---|---|---|---|
| 7,668,804 B1* | 2/2010 | El-Helw | G06F 17/30306 707/719 |
| 7,831,325 B1* | 11/2010 | Zhang | G06F 9/5044 700/108 |
| 8,046,764 B2 | 10/2011 | Yamakabe et al. | |
| 8,250,569 B1* | 8/2012 | Badenell | G06F 8/61 717/174 |
| 8,448,161 B2* | 5/2013 | Goldman | G06F 8/65 717/170 |
| 8,725,886 B1 | 5/2014 | Pulier et al. | |
| 2005/0049973 A1* | 3/2005 | Read | G06Q 10/06 705/59 |
| 2008/0028218 A1* | 1/2008 | Simon | G06F 21/105 713/170 |
| 2011/0054846 A1* | 3/2011 | Karayi | G06F 1/3203 702/186 |
| 2012/0203773 A1* | 8/2012 | Shiralkar | H04L 41/50 707/723 |
| 2013/0007481 A1* | 1/2013 | Chakra | G06F 1/3206 713/320 |
| 2013/0014096 A1* | 1/2013 | Mayo | G06F 8/62 717/170 |
| 2013/0097601 A1 | 4/2013 | Podvratnik et al. | |
| 2013/0104125 A1* | 4/2013 | Sarma | G06F 21/10 718/1 |
| 2013/0191542 A1 | 7/2013 | Matczynski et al. | |
| 2014/0149354 A1 | 5/2014 | Chan et al. | |
| 2015/0007180 A1 | 1/2015 | Sharp et al. | |

OTHER PUBLICATIONS

Jang et al., "Profile for Effective Service Management on Mobile Cloud Computing," Advanced Communication and Networking, Third International Conference, ACN 2011, 2011, CCIS 199, pp. 139-145.
Ma et al., "A User's Profile Model for Cloud Computing Service," Advanced Materials Research, 2013, 1729, 774-776, <scientific.net/AMR.774-776.1729>.
Marcum, "Automatically Uninstall Unused Applications," <myitforum.com/myitforumwp/2012/07/23/automatically-uninstall-unused-applications/>, 2012.
Mell et al., "The NIST Definition of Cloud Computing," National Institute of Standards and Technology, Oct. 7, 2009, Version 15, NIST, Gaithersburg, MD, US.
Cao et al., "Managing a Set of Assets for a User in a Shared Pool of Configurable Computing Resources", U.S. Appl. No. 14/663,977, filed Mar. 20, 2015.
List of IBM Patents or Patent Applications Treated As Related.

* cited by examiner

MANAGING A SET OF ASSETS FOR A USER IN A SHARED POOL OF CONFIGURABLE COMPUTING RESOURCES

BACKGROUND

This disclosure relates generally to computer systems and, more particularly, relates to managing a set of assets for a user in a shared pool of configurable computing resources. The amount of data that needs to be managed by enterprises is increasing. Management of assets may be desired to be performed with as little waste as possible. As data needing to be managed increases, the need for management efficiency may increase.

SUMMARY

Disclosed aspects include managing a set of assets for a user in a shared pool of configurable computing resources. The shared pool of configurable computing resources has a set of virtual machines. A set of usage data for the user is established. The set of usage data corresponds to usage of an asset by the user. Based on the set of usage data for the user, an asset action for the asset for the user on a virtual machine is determined. In response to determining the asset action for the asset, the asset action for the asset for the user on the virtual machine is selected.

In embodiments, the set of usage data indicates use of the asset by the user for a temporal period below a threshold value. For example, the set of usage data may indicate the user has not used the asset (e.g., application) in the past two years which is below a threshold value of using the asset once per month. In embodiments, in response to selecting to prevent the installation of the asset for the user on the virtual machine, the virtual machine is generated without the asset. For instance, subsequent to storing a data value that disables future installation of a particular application for a particular user on a virtual machine, the virtual machine is created without the particular application.

Accordingly, resources such as bandwidth, processing, or memory may be saved. Altogether, aspects of the disclosure provide a methodology for managing a set of assets for a user in a shared pool of configurable computing resources that may provide performance or efficiency benefits.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
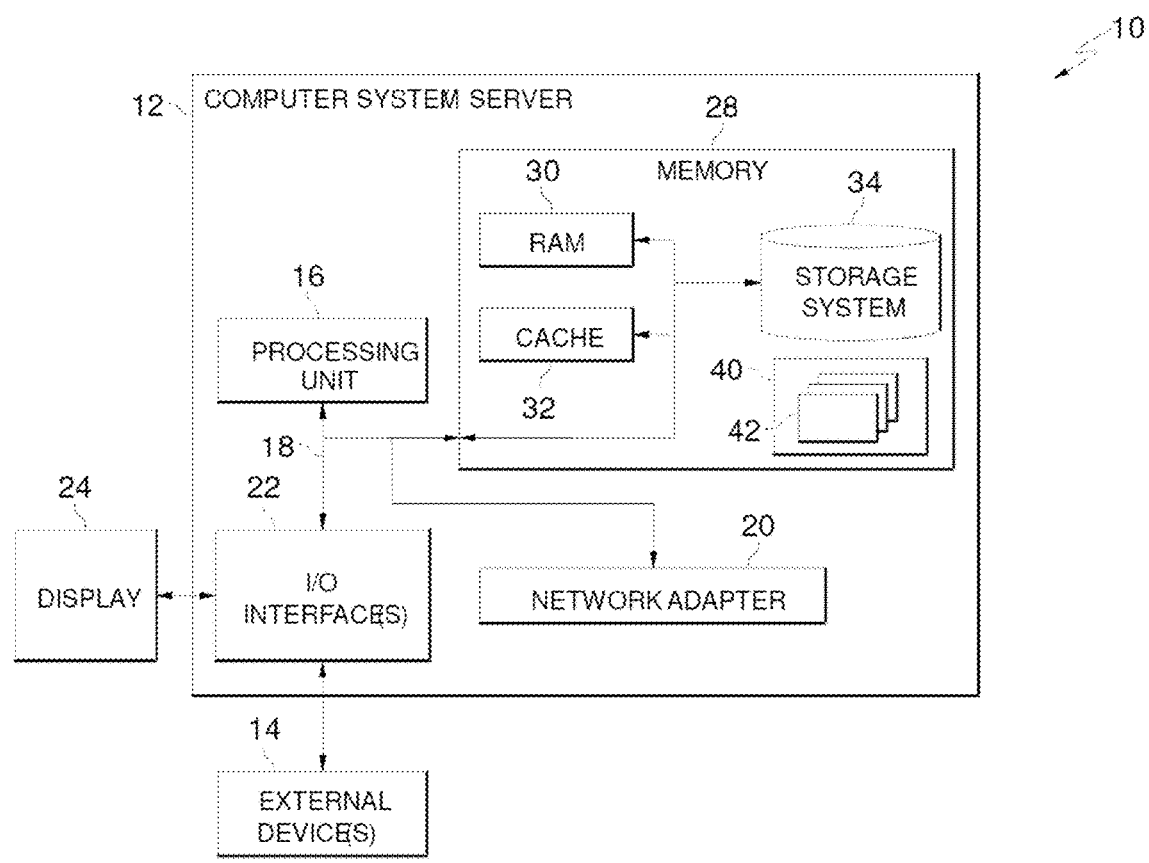
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure may provide performance or efficiency benefits when managing a set of assets for a user. For example, resources such as bandwidth, processing, or memory may be saved because certain assets in a cloud environment can waste resources. For example, resources not relevant to the current user can be freed up and allocated to other users within the cloud environment, users may realize cost impacts for these unused resources, unused resources may have impacts with respect to licenses to be installed, or unused resources may have maintenance impacts even if not used. Embodiments described herein may create an instance that is specifically tailored to the user. In particular, aspects of the disclosure may prevent installation of an asset, hibernate an asset, or remove an asset based on a set of usage data.

Aspects of the disclosure include a method, system, and computer program product for managing a set of assets for a user in a shared pool of configurable computing resources. The shared pool of configurable computing resources has a set of virtual machines. A set of usage data for the user is established. The set of usage data corresponds to usage of an asset by the user. Based on the set of usage data for the user, an asset action for the asset for the user on a virtual machine is determined. In response to determining the asset action for the asset, the asset action for the asset for the user on the virtual machine is selected.

In embodiments, the set of usage data indicates use of the asset by the user for a temporal period below a threshold value. For example, the set of usage data may indicate the user has not used the asset (e.g., application) in the past two years which is below a threshold value of using the asset once per month. In embodiments, in response to selecting to prevent the installation of the asset for the user on the virtual machine, the virtual machine is generated without the asset. For instance, subsequent to storing a data value that disables future installation of a particular application for a particular user on a virtual machine, the virtual machine is created without the particular application.

Accordingly, resources such as bandwidth, processing, or memory may be saved. In embodiments, a set of asset actions includes preventing installation of the asset, hibernating the asset, or removing the asset. In certain embodiments, a particular asset action may include removing the asset in response to hibernating the asset. Altogether, aspects of the disclosure provide a methodology for managing a set of assets for a user in a shared pool of configurable computing resources that may provide performance or efficiency benefits.

It is understood in advance that although this disclosure includes a detailed description regarding cloud computing, implementation of the teachings recited herein are not limited to a cloud computing environment. Rather, embodiments of the disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
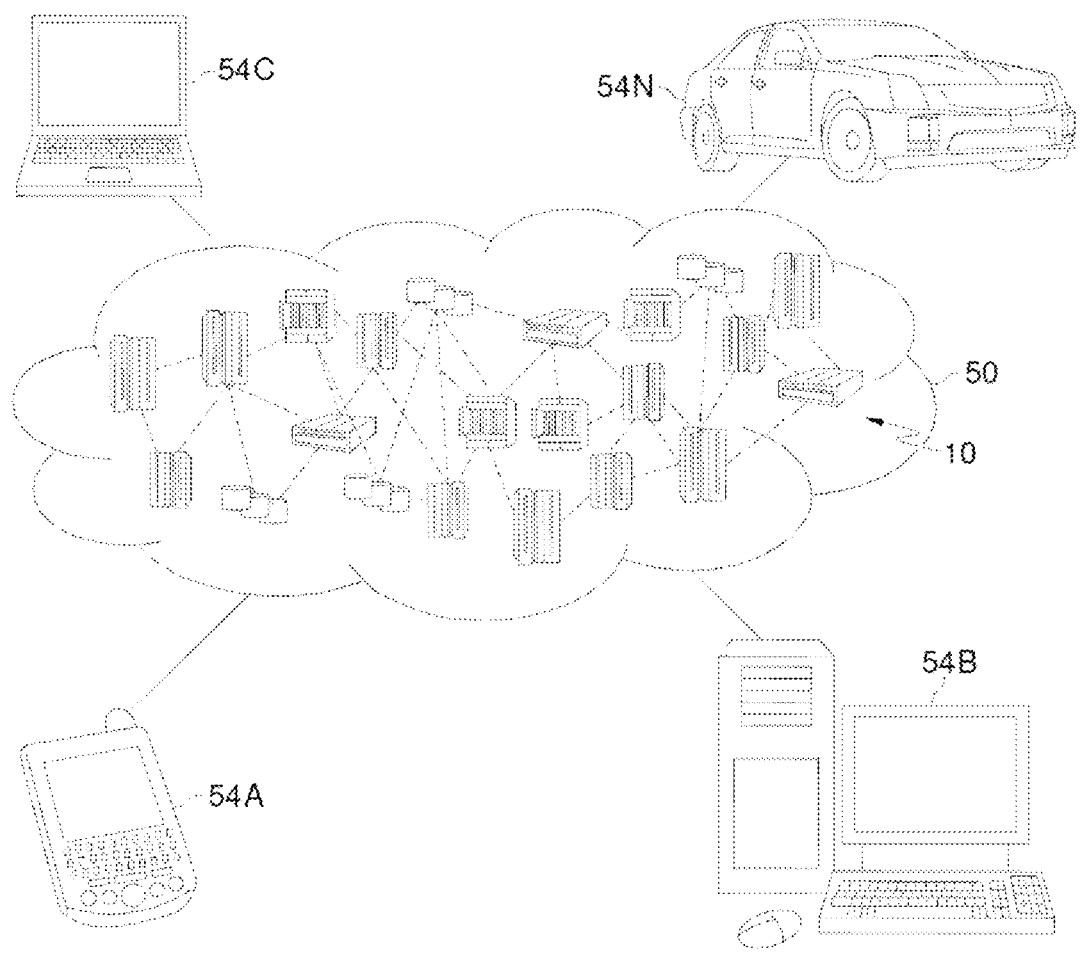
FIG. 2 depicts a cloud computing environment according to embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
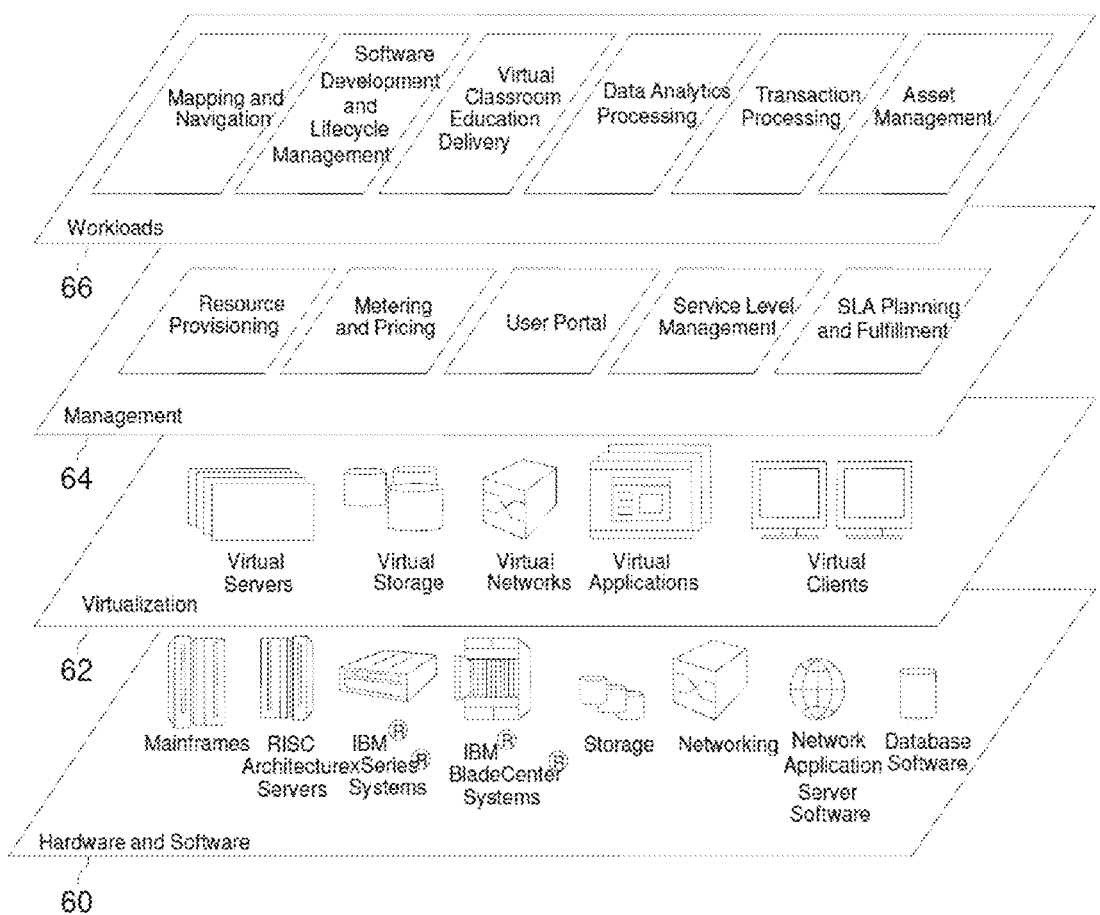
FIG. 3 depicts abstraction model layers according to embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and asset management. Asset management may prevent an installation of an asset for a user on a virtual machine. Performance or efficiency benefits may be realized by saving on resources such as bandwidth, processing, or memory.

Figure 4:
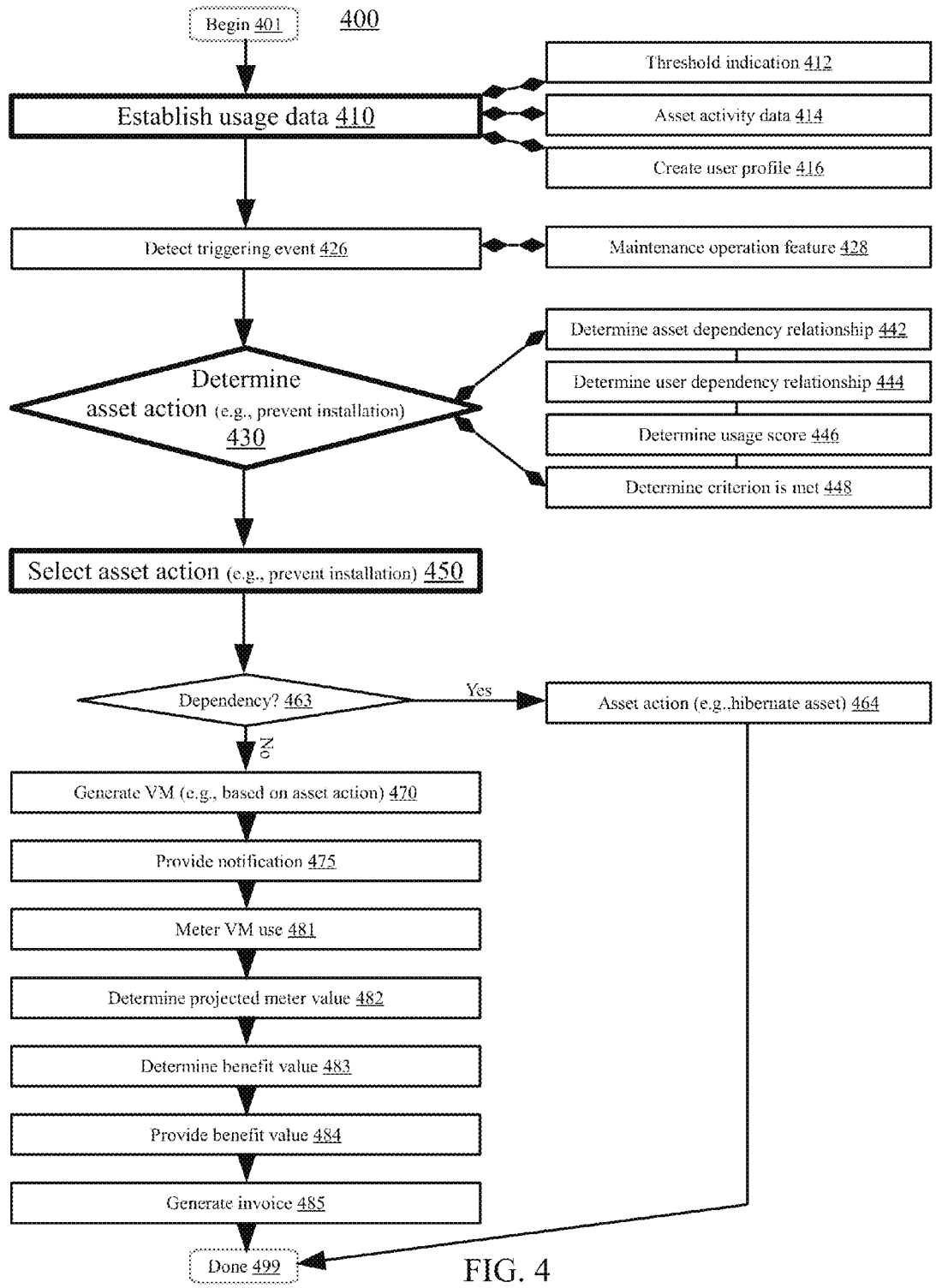
FIG. 4 is a flowchart illustrating a method for managing a set of assets for a user in a shared pool of configurable computing resources according to embodiments.

FIG. 4 is a flowchart illustrating a method 400 for managing a set of assets for a user in a shared pool of configurable computing resources according to embodiments. For example, the set of assets can include content, configurations, applications, jobs, or files. Particular embodiments described herein may discuss specific relevancy with respect to one or more applications as the set of assets. The shared pool of configurable computing resources has a set of virtual machines (e.g., one or more virtual machines created by a cloud manager). Method 400 may begin at block 401.

At block 410, a set of usage data for the user is established. The set of usage data corresponds to usage of an asset by the user. The set of usage data may indicate use of the asset by the user for a temporal period below a threshold value at block 412. For example, the set of usage data may indicate the user has not used the asset (e.g., application) at all in the past six months which is below a threshold value of using the asset at least twice per three months. In embodiments, the threshold value may be temporal in nature (e.g., February, two years, 36-hour interval). In certain embodiments, the threshold may include a consumption score (e.g., 85 gigabytes per user, 12 terabytes over two days).

Example usage data/statistics can relate to online/editing time, a count of applications/tasks/jobs opened/performed, identification of content, frequency, capacity, latency, or user/application interactions. In embodiments, usage data may be obtained for a group of categories. The amount and type of data obtained may vary depending upon the context. In some embodiments, the obtained data may include the amount of time that the user uses a particular category. In various embodiments, the obtained data may include the total number of users using a particular category at a given time or over a given time interval.

In embodiments, the set of usage data that corresponds to usage of an asset by the user includes asset activity data for the user across both the shared pool of configurable computing resources and the set of virtual machines at block 414. For instance, activity by the user may be monitored/tracked/obtained across one or more cloud environments. As such, if the user is actively using a specific resource on a first virtual machine of a cluster but not on other virtual machines of the cluster, then aspects of the disclosure could use such asset activity data to make informed decisions (e.g., relative to looking at each virtual machine individually when installing an application). For example, a single developer/administrator could be monitored/tracked across a group of instances involved in a group of web applications to determine licenses needed in new virtual machines of different types. Accordingly, a group of users may have different types of virtual machines with different software/licenses for each.

In embodiments, establishing the set of usage data for the user includes creating a user profile for the user at block 416. The user profile can include an asset usage catalog which indicates utilization on an asset-by-asset basis mapped with the user. The user profile may have a virtual machine usage catalog which indicates utilization on a virtual machine-by-virtual machine basis mapped with the user. The user profile may include a dependency catalog which maps a first asset that relies on a second asset, a first user that relies on a second user, or a specific asset that relies on a specific user (or groups thereof). Such catalogs may be stored together or separately, and may include various combinations of such/similar features. In embodiments, the user profile includes a mosaic of elements mentioned herein.

In embodiments, a triggering event is detected at block 426. The triggering event can relate to a maintenance operation (e.g., write, read, cleanup, allocate, deallocate, running statistics, startup, shutdown). The triggering event may be detected before determining to perform the asset action for the asset (e.g., prevent the installation of the asset) for the user on the virtual machine. In certain embodiments, the triggering event related to the maintenance operation includes a maintenance timeframe (e.g., overnight, between shifts, lessened power cost period) or an action schedule (e.g., asset initiation, asset closure, job running).

At block 430, based on the set of usage data for the user, an asset action for the asset for the user on a virtual machine is determined. For example, if the set of usage data for the user indicates a particular asset has not been used by the user in the past year, the particular asset may be prevented from being installed on the virtual machine. To illustrate, usage data for UserA may have a record with a null value for UserA utilizing a floss-tracker application (e.g., an application which keeps data on an individual's propensity to floss teeth). Since UserA does not utilize the floss-tracker application, resources may be saved by determining not installing it in a cloud environment that UserA logs-onto. In embodiments, determining the asset action for the asset could include determining to hibernate the asset (e.g., to save resources, to stage removal of the asset) or determining to remove the asset (e.g., delete the asset).

In embodiments, the determination process can include a set of operations such as the set of operations that follows. An asset dependency relationship for the asset with respect to the set of assets may be determined at block 442 (e.g., program x depends on program y, job w depends on file z). A user dependency relationship for the user with respect to another user may be determined at block 444 (e.g., UserK depends on Used to be online and vice-versa). A usage score of the asset by the user for a temporal period can be determined at block 446. In embodiments, the usage score of the asset by the user for the temporal period may be with respect to a temporal threshold value (e.g., ApplicationP by UserQ for the month of July is 34 and is less than the monthly threshold value of 45 set by the administrator via one of three options randomly selected). A comparison may be made with respect to determined relationships/scores. A criterion for installation prevention may be determined to be met by the asset dependency relationship, the user dependency relationship, or the usage score at block 448 (e.g., since program r does not depend on program t and UserF does not depend on UserE and ApplicationU was used by UserE for the last two years less than 3 times for a usage score of 0.0002 relative to a threshold of 0.15, ApplicationU—which is related to program r—may be prevented from future installations on a specified virtual machine for UserE). Other sets of operations are contemplated including portions of similar relationships/comparisons.

At block 450, in response to determining the asset action for the asset, the asset action for the asset for the user on the virtual machine is selected. Selecting can include, for example, storing a data value (e.g., entering a digit/character in a database), transmitting a data object (e.g., sending an object having metadata), routing a message (e.g., publishing a startup expectation), or providing/performing/processing an operation (e.g., a notification). The asset action selected can be at least one of preventing installation, hibernating, or removing. Preventing can include rejecting, not receiving, prohibiting, blocking, disregarding, suppressing, ignoring, precluding, or at least deterring. Installing may include initiation/commencement of a deployment/installation/allocation. Hibernating can include a staging operation (e.g., for removal), a stopping of services, a closure of tables, etc. in a manner that has positive impacts on resource consumption. Removing may include deleting, withdrawing, disconnecting, or eliminating. For the user on the virtual machine may refer to a specific user during the creation of a new virtual machine. In embodiments, the specific user may be a sub-user (e.g., as a subset is to a set in mathematics) of an existing user.

In embodiments, a user dependency relationship with respect to another user is detected (e.g., noticed/received/obtained) or determined/evaluated (e.g., comparison with a threshold) at block 463. In response to detecting the user dependency relationship between the user and another user, the asset can be hibernated at block 464. As such, an asset/application that would have otherwise been prevented from being installed can be placed in a hibernating mode when the (another) user is at least partially dependent on the (another) user. The hibernating mode may have performance or efficiency benefits relative to a running mode. Preventing installation may have performance or efficiency benefits relative to the hibernating mode. In embodiments, no detection of the user dependency relationship occurs. Such may have a frequency greater than detection of the user dependency relationship and, as such, the hibernating mode aspect may have applicability in certain specific environments.

In embodiments, the virtual machine is generated without the asset at block 470. Generating the virtual machine may occur in response to selecting the asset action for (e.g., to prevent the installation of) the asset for the user on the virtual machine. For instance, subsequent to transmitting a data packet that disables future installation of a particular application for a particular user on a virtual machine, the virtual machine is produced without the particular application (e.g., installation requests for the particular application are disregarded).

Generating the virtual machine can include using the set of usage data for the user and structuring a set of features to match to aspects of information of the set of usage data in the context of a set of virtual machine components. In embodiments, a notification which indicates installation without the asset can be provided to the user at block 475 (e.g., by a cloud manager, by an asset management module). For example, the notification may be via e-mail, graphical user interface, or a resource indication tool.

In embodiments, a set of operations relating to serving the user may be included at blocks 481, 482, 483, 484, 485. Use of the virtual machine may be metered at block 481 (e.g., monitoring usage, detecting usage, calculating usage). Metering may occur in response to generating the virtual machine without the asset or in accordance with another asset action. A projected meter value for the virtual machine with the asset can be determined at block 482 (e.g., predicting expectations without disclosed methodology). By comparing the metered use with the projected meter value, a benefit value may be determined at block 483 (e.g., ascertaining performance or efficiency benefits such as cost, bandwidth, processing, memory). The benefit value may be provided to the user at block 484 (e.g., returning advantage of or support for methodology). An invoice can be generated based on the metered use at block 485 (e.g., creating productivity chart).

Method 400 concludes at block 499. Aspects of method 400 may provide performance or efficiency benefits when managing a set of assets for a user. For example, aspects of method 400 may save resources such as bandwidth, processing, or memory. Altogether, a shared pool of configurable computing resources may be managed more efficiently.

Figure 5:
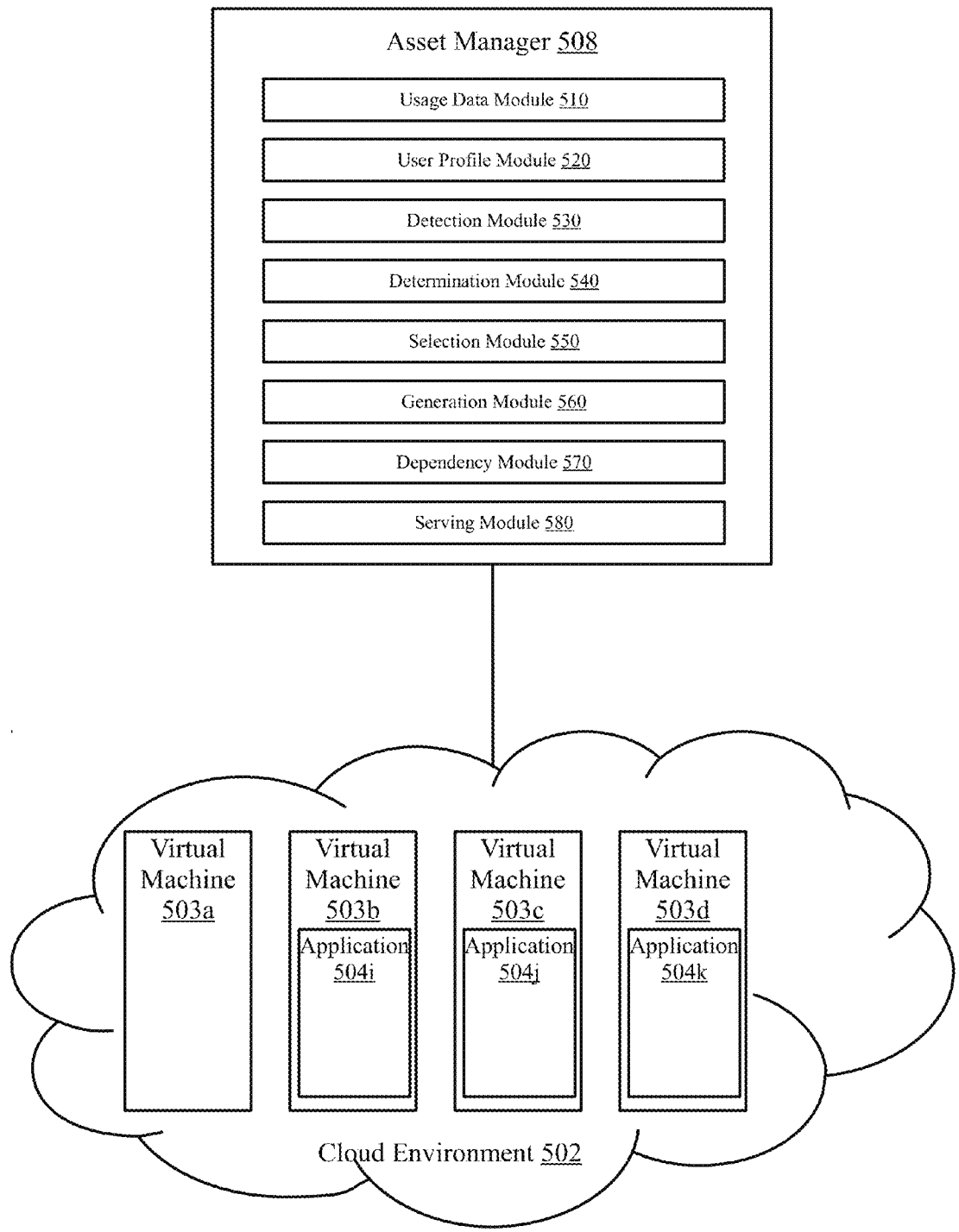
FIG. 5 shows a system for managing a set of assets for a user in a shared pool of configurable computing resources having a set of virtual machines according to embodiments.

FIG. 5 shows a system 500 for managing a set of assets for a user in a shared pool of configurable computing resources having a set of virtual machines according to embodiments. In embodiments, method 400 may be implemented in an asset manager 508. The asset manager may be a module that is at least a portion of a cloud manager. As such, aspects of the discussion related to FIG. 4 and method 400 may be used/applied/implemented in the system 500. Asset manager 508 may be implemented in hardware, software or firmware executable on hardware, or a combination thereof.

The shared pool of configurable computing resources (e.g., cloud environment 502) can include a set of virtual machines 503 include specific virtual machines 503a, 503b, 503c, 503d. The set of virtual machines 503 can include a set of assets such as application 504 illustrated as specific applications 504i, 504j, 504k. The cloud environment 502, and aspects thereof, may be associated with a shared pool manager (e.g., cloud manager) having the asset manager 508.

In embodiments, the asset manager 508 may be sufficiently stand-alone and associated directly with the cloud environment 502. The asset manager 508 can hibernate, remove, or prevent installation of assets (e.g., applications, resources) which were used sparingly (e.g., unused) in the past during creation of (new) virtual machines. In embodiments, the asset manager 508 can have a (graphical) user interface that allows a user to interact with the asset manager 508 to perform any suitable function, including provisioning of assets for virtual machines, deprovisioning of assets for virtual machines, performance analysis of assets of the cloud, etc. Of course, asset manager 508 could include many other features or functions known in the art that are not shown in FIG. 5.

The asset manager 508 may include a usage data module 510 to perform operations associated with blocks 410, 412, 414 of method 400. The asset manager 508 can have a user profile module 520 to perform operations associated with block 416 of method 400. The asset manager 508 may have a detection module 530 to perform operations associated with blocks 426, 428 of method 400. The asset manager 508 can include a determination module 540 to perform operations associated with blocks 430, 442, 444, 446, 448 of method 400. The asset manager 508 may include a selection module 550 to perform operations associated with block 450 of method 400. The asset manager 508 can have a generation module 560 to perform operations associated with blocks 470, 475 of method 400. The asset manager 508 may have a dependency module 570 to perform operations associated with blocks 463, 464 of method 400. The asset manager 508 can include a serving module 580 to perform operations associated with blocks 481, 482, 483, 484, 485 of method 400. A variety of module configurations and arrangements are considered have functionality or form distributed or consolidated.

Consider the illustrative example that follows. Virtual environments (e.g., cloud environment 502) may exist in a manner that is ambiguous to a user. The user sometimes only needs a specific application (e.g., 504k) or subset of applications (e.g., 504j and 504k but not 504i) on a virtual machine (e.g., virtual machine 503a). As a result, some applications can be irrelevant or wasted resources. In certain situations, this can have a considerable impact in a cloud environment such as cloud environment 502. For example, resources not relevant to the current user can be freed up and allocated to other users within the cloud environment, users still ultimately pay for these unused resources, unused resources may require expensive licenses to be installed, or unused resources are kept up to date even if not used.

Aspects of the disclosure may create a user profile (e.g., using the user profile module 520) to determine the loading of assets/resources on a virtual environment (e.g., using the generation module 560). The user profile can be specific to a single user and may include past usage characteristics (e.g., using usage data module 510) which can determine (e.g., using the determination module 540) the assets/resources on a virtual machine that should be loaded or removed thereby creating an instance that is specifically tailored to the user. Potential benefits include only necessary resources will be consumed by the user minimizing footprint within the cloud environment, cost savings since unnecessary licenses will not be used nor will unnecessary cloud resources be consumed (e.g., using serving module 580), potential performance gains in that existing compute resources can be devoted to a streamlined user-specific virtual environment, or availability improvement because unused resources are not maintained including with respect to emergency security fixes.

A user profile (e.g., using user profile module 520) can be created for a specific user based on system and application logs, user history, virtual machine usage, or application/system dependencies (e.g., using usage data module 510 or dependency module 570). An unused resource may be determined by a dependency to active applications and users (e.g., using dependency module 570), an interval in which a certain resource is needed (e.g., if an application only runs every 6 months, then it is deemed to be unused until it is kicked off during that final/6th month), as indicated by the cloud administrator (e.g., user input). The user profile may be utilized to assist the prevention of loading (e.g., using selection module 550) or unloading of unused resources for that specific user.

If it is determined via the user profile that at least a portion of users within the cloud ecosystem did not need certain resources but other users within the same cloud ecosystem are using those resources, then for the users who do not need the resources the system can hibernate (e.g., using the dependency module 570) those unused resources for those users and for users who will need the resources the system can resume those resources for those users. If it is determined (e.g., using the determination module 540) via the user profile that all users within the cloud ecosystem did not need certain resources, then the unused resources may be removed, archived, or unlicensed (e.g., all of the mentioned). In a first particular instance, the system may use prior user history and user patterns to predict when a certain user will be using a set of resources for preemptively hibernating or resuming those resources. In a second particular instance, the system may take advantage of cloud maintenance periods and schedule actions required (e.g., using detection module 530).

Aspects of system 500 may provide performance or efficiency benefits when managing a set of assets for a user. For example, aspects of system 500 may save resources such as bandwidth, processing, or memory. Altogether, a shared pool of configurable computing resources may be managed more efficiently.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing a set of assets, wherein each asset in the set of assets includes a particular application for a user in a shared pool of configurable computing resources having a set of virtual machines, the system comprising:
   a memory having a set of computer readable computer instructions, and
   a processor for executing the set of computer readable instructions, the set of computer readable instructions including:
   monitoring asset activity data for the user across both the shared pool of configurable computing resources and the set of virtual machines;
   establishing a set of usage data for the user, the set of usage data corresponding to a usage of an asset by the user, the set of usage data including asset usage by the user for a temporal period below a threshold value, the set of usage data further including asset activity data for the user across both the shared pool of configurable computing resources and the set of virtual machines, wherein the establishing the set of usage data includes creating a user profile for the user, the user profile including a dependency catalog;
   determining, based on the set of usage data for the user, an asset action for the asset for the user on at least one of the set of virtual machines, wherein the determining the asset action for the asset includes:
      determining asset dependency relationship and user dependency relationship from the dependency catalog;
      determining usage score based on the asset usage by the user for the temporal period below the threshold value and the asset activity data for the user; and
      determining that the asset dependency relationship, user dependency relationship, and usage score meet a criterion for the asset action;
   selecting, in response to determining the asset action for the asset, the asset action for the asset for the user on the at least one of the set of virtual machines; and
   performing the asset action for the asset for the user on the at least one of the set of virtual machines, wherein the asset action is selected from the group consisting of: preventing an installation of the asset for the user, removing the asset for the user, and hibernating the asset for the user on the at least one of the set of virtual machines.

2. The system of claim 1, further comprising generating the at least one of the set of virtual machines without the asset to perform the asset action for the asset for the user on the at least one of the set of virtual machines, wherein the asset action for the asset includes preventing the installation of the asset, and wherein the asset includes the particular application.

3. The system of claim 1, further comprising:
   metering, in response to selecting the asset action for the asset, use of the at least one of the set of virtual machines, wherein metering use of the virtual machine includes:
      monitoring, relating to serving the user, use of the at least one of the set of virtual machines with respect to use by the user,
      detecting, relating to serving the user, use of the at least one of the set of virtual machines with respect to use by the user, and
      calculating, relating to serving the user, use of the at least one of the set of virtual machines with respect to use by the user; and
   generating an invoice based on the metered use.

4. The system of claim 3, further comprising:
   determining a projected meter value for the at least one of the set of virtual machines with the asset, wherein the projected meter value indicates an expected use prediction without managing the set of assets;
   determining, by comparing the metered use with the projected meter value, a benefit value; and
   providing the benefit value to the user.

5. The system of claim 1, further comprising:
   monitoring activity by the user across one or more cloud environments to obtain the asset activity data.

6. The system of claim 1, further comprising providing, to the user, a notification which indicates the asset action for the asset.

7. The system of claim 1, further comprising:
   receiving, via the administrator, the threshold value.

8. The system of claim 1, further comprising hibernating the asset for the user in response to detecting a user dependency relationship with respect to another user when the another user is at least partially dependent on the user.

9. The system of claim 1, further comprising determining the asset action for the asset for the user on the at least one of the set of virtual machines in response to detecting a triggering event related to a maintenance operation, wherein the maintenance operation is selected from the group consisting of: write, read, cleanup, allocate, deallocate, running statistics, startup, and shutdown.

10. The system of claim 9, wherein the triggering event related to the maintenance operation includes a maintenance timeframe and an action schedule, wherein the action schedule is selected from the group consisting of: asset initiation, asset closure, and job running.

11. The system of claim 1, further comprising:
   mapping, to form the dependency catalog, reliance of a first asset with respect to a second asset,
   mapping, to form the dependency catalog, reliance of a first user with respect to a second user, and
   mapping, to form the dependency catalog, reliance of a specific asset with respect to a specific user.

12. The system of claim 1, further comprising:
   carrying-out, to provision computing capabilities automatically without human interaction, each of: the establishing, the determining, the selecting, and the performing.

13. The system of claim 1, further comprising:
freeing, by performing the asset action for the asset for the user on the at least one of the set of virtual machines, a set of resources with respect to a current user.

14. The system of claim 1, wherein the shared pool of configurable computing resources includes a hybrid computing environment and the set of virtual machines includes both a set of on-premises virtual machines and a set of off-premises virtual machines.

15. A computer program product for managing a set of assets for a user in a shared pool of configurable computing resources having a set of virtual machines, the computer program product comprising a computer readable storage medium having program instructions embodied therewith, wherein the computer readable storage medium is not a transitory signal per se, the program instructions executable by a processor to cause the processor to perform a method comprising:
monitoring asset activity data for the user across both the shared pool of configurable computing resources and the set of virtual machines;
establishing a set of usage data for the user, the set of usage data corresponding to a usage of an asset by the user, the set of usage data including asset usage by the user for a temporal period below a threshold value, the set of usage data further including asset activity data for the user across both the shared pool of configurable computing resources and the set of virtual machines, wherein the establishing the set of usage data includes creating a user profile for the user, the user profile including a dependency catalog;
determining, based on the set of usage data for the user, an asset action for the asset for the user on at least one of the set of virtual machines, wherein the determining the asset action for the asset includes:
determining asset dependency relationship and user dependency relationship from the dependency catalog;
determining usage score based on the asset usage by the user for the temporal period below the threshold value and the asset activity data for the user; and
determining that the asset dependency relationship, user dependency relationship, and usage score meet a criterion for the asset action;
selecting, in response to determining the asset action for the asset, the asset action for the asset for the user on the at least one of the set of virtual machines; and
performing the asset action for the asset for the user on the at least one of the set of virtual machines, wherein the asset action is selected from the group consisting of:
preventing an installation of the asset for the user,
removing the asset for the user, and
hibernating the asset for the user on the at least one of the set of virtual machines.

16. The computer program product of claim 15, wherein the program instructions are stored in a computer readable storage medium in a data processing system, and wherein the program instructions were downloaded over a network from a remote data processing system.

17. The computer program product of claim 15, wherein the program instructions are stored in a computer readable storage medium in a server data processing system, and wherein the program instructions are downloaded over a network to a remote data processing system for use in a computer readable storage medium with the remote data processing system.

* * * * *